March 8, 1932.  R. J. NEELY  1,848,191
MOUNTING FOR TRUCK TANKS
Filed Nov. 14, 1929    2 Sheets-Sheet 1
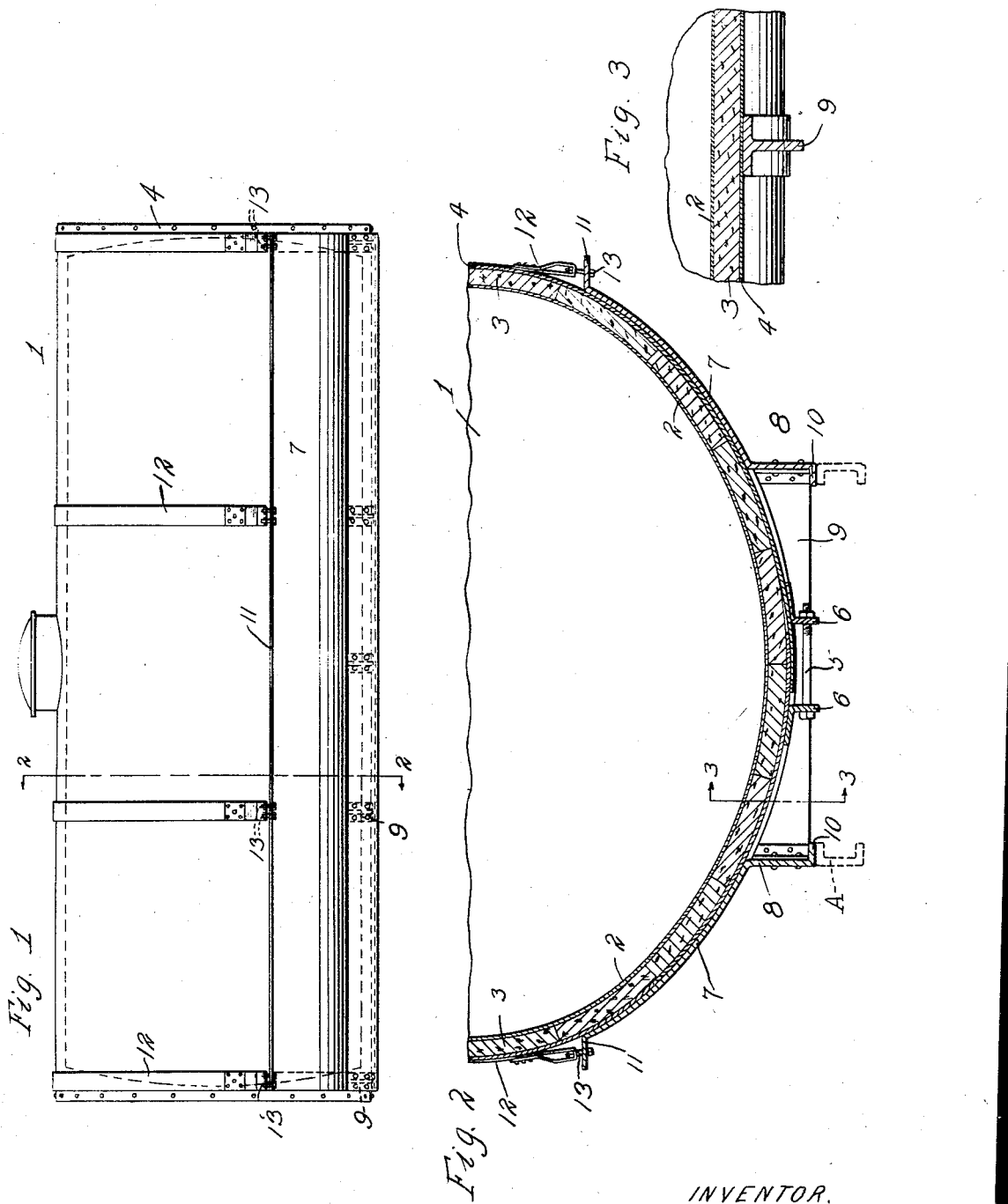
INVENTOR.
Raymond J. Neely
by Parker & Prochnow
ATTORNEYS.

March 8, 1932.   R. J. NEELY   1,848,191
MOUNTING FOR TRUCK TANKS
Filed Nov. 14, 1929   2 Sheets-Sheet 2
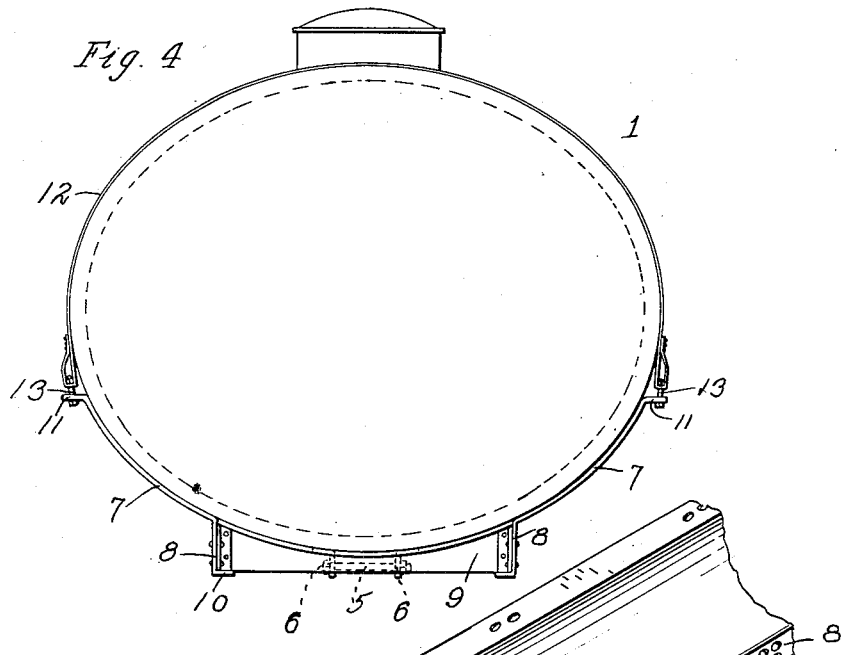
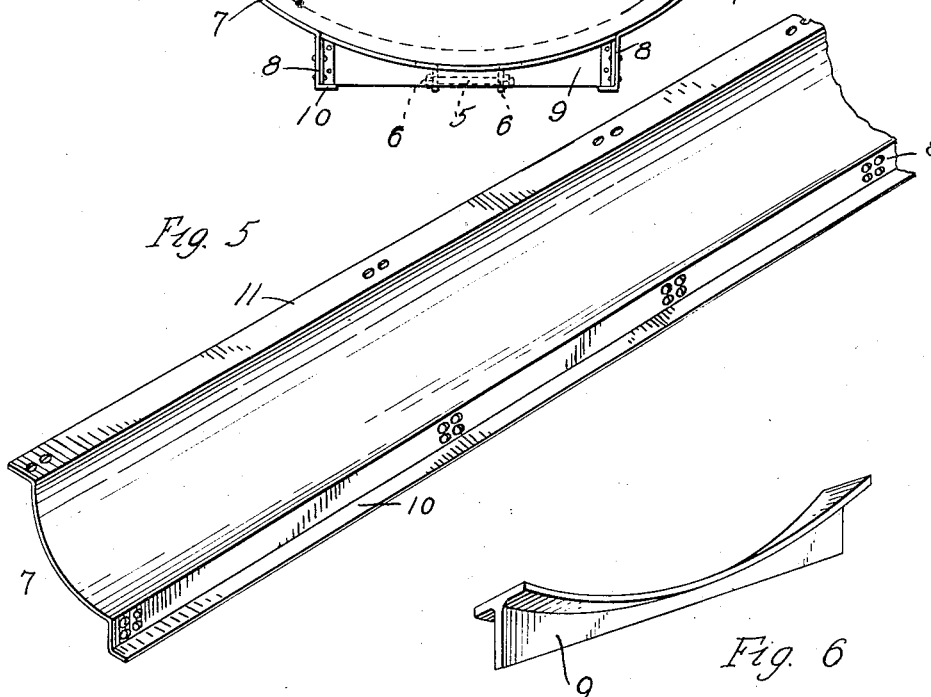
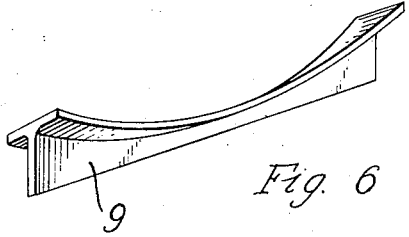
INVENTOR.
Ramond J. Neely
by Parker & Prochnow
ATTORNEYS.

Patented Mar. 8, 1932

1,848,191

UNITED STATES PATENT OFFICE

RAYMOND J. NEELY, OF LITTLE FALLS, NEW YORK, ASSIGNOR TO CHERRY-BURRELL CORPORATION, OF LITTLE FALLS, NEW YORK

MOUNTING FOR TRUCK TANKS

Application filed November 14, 1929. Serial No. 407,245.

This invention relates to truck tanks, and particularly to the mounting of insulated tanks on the frame of a truck. Where tanks for trucks are used for transportation of oils or water they may be made of single walls to which supporting members may be directly bolted, riveted or welded. For truck tanks used for the transportation of milk or similar liquids, it is desirable to form the tanks with a comparatively light lining or shell of non-corrosive metal, such as pure nickel or stainless steel, or with a thin metal shell plated with a suitable metal, the shell being surrounded by an insulating layer and then a comparatively light jacket which is contracted to draw or clamp the insulation to the lining shell. With such a tank it is necessary, for the proper support thereof, to provide a comparatively large area of contact between the jacket of the tank and the mounting. It is impracticable to make either a tank or a rigid mounting therefor so accurately that they will just fit one another, and if they do not fit, as is almost always the case, the continual jar and vibration from the road causes a severe punishment to both the tank and the mounting. The high spots will in time sink into and injure the jacket of the tank during such vibration.

An object of this invention is to provide improved means for mounting tanks of any kind on trucks, which will conform closely to the surface of the tank, and which will support the tank through contact over relatively broad surface areas, and which will properly, firmly, rigidly and securely support the tank, without injury thereto, during the vibrations to which the truck and tank are subjected in use.

Another object of the invention is to provide improved means for mounting a tank on a truck, with which the tank may be securely and firmly mounted and held from chafing on the mounting; with which the tank may be easily and quickly demounted or mounted, and which will be relatively simple, durable, light in weight and inexpensive.

Various other objects and advantages will be apparent from the following description of an embodiment of the invention, and the novel features will be particularly pointed out hereinafter in connection with the appended claims.

In the accompanying drawings:

Fig. 1 is a side elevation of a tank and its mounting, constructed in accordance with this invention;

Fig. 2 is a transverse, sectional elevation of the same, the section being taken approximately along the line 2—2 of Fig. 1;

Fig. 3 is a sectional elevation of a portion of the section being taken approximately along the line 3—3 of Fig. 2;

Fig. 4 is an end elevation of the same;

Fig. 5 is a perspective of one of the elements of the mounting, and

Fig. 6 is a perspective of another element of the mounting.

In the illustrated embodiment of the invention, the tank 1 to be mounted may be constructed in any desired manner, and may be of the type especially suited for the handling of liquids such as milk. Such tanks include an inner relatively thin shell 2 formed of metal or other material which will not corrode or be disintegrated under the action of the liquid to be placed in the tank. For example, the lining shell 2 may be of pure nickel, nickle plated metal, or stainless steel, and surrounded by a layer of insulation 3, the insulation being further surrounded by a comparatively light protecting jacket 4 which is contracted and clamped around the insulated inner shell. This outer jacket may have overlapping portions at the bottom that may be drawn together by bolts 5 connecting ears 6 provided on the adjacent or overlapping edges.

The tank may be of any desired shape, such as circular or oval in cross section, and the support therefore includes a pair of plates or members 7 which are concave or arcuate in transverse cross section, and which extend longitudinally of the tank 1, along its under face. The plates 7 are spaced apart somewhat along the bottom of the tank and provided along their nearest edges with outwardly extending flanges 8. A plurality of cross bars 9 are secured at their ends to the flanges 8 in any suitable manner such as by rivets, bolts, or by welding. If desired the outer edges of the flanges 8 may be turned toward one another as at 10 beneath the lower edges of the cross bars 9 to form base edges of material width which may rest upon and are supported by the usual chassis frame, whose side frame channels or bars A are illustrated conventionally by dash lines in Fig. 2.

The cross bars 9 are arranged at intervals along the length of the tank and each bar may be T-shaped in cross section, as shown in Figs. 3 and 6, with the head of the T extending arcuately along the under surface of the tank, as shown in Fig. 2. The outer or free end edge of the leg or web of the T may be straight from end to end, as shown in Figs. 2 and 6, so as to not depend materially below the flange 10. The bars 9 rigidly connect the flanges 8 and form with the plates 7 a rigid skeleton-like frame or base to support the tank.

The plates 7 are preferably formed of flexible material, such as flexible steel, and since they are rigidly secured only at the flanges 8 to the base, the plates may be flexed somewhat freely towards their free side edges and thus may be made to conform closely to the portion of the undersurface of the tank 1 which is engaged or covered thereby. The free longitudinal edges of the plates 7 are preferably flanged outwardly as at 11.

A plurality of straps 12 are passed over the tank at intervals along the length of the same, and at their free ends are connected by bolts 13 to flanges 11 of the flexible plates 7, so that when the bolts 13 are tightened, the straps will be drawn down upon the tank and will confine the tank snugly in the seat provided by the plates 7 and the cross bars 9. When the straps 12 are tightened, such as by adjustment of the bolts 13, the free longitudinal edges of the plates will be drawn towards the tank surface, and the plates 7 will flex sufficiently towards their free side edges to fit the arcuate under surface of the tank for a considerable distance, so that the jacket of the tank which rests upon the plates will have relatively broad areas of contact with the plates 7 and the cross bars 9.

This type of mounting conforms to the surfaces of tanks of different curved shapes and sizes and firmly supports the tanks. By reason of the broad areas of contact between the tank and its support, the support will not dig into the relatively thin outer jacket of the tank. The tank may be easily and quickly removed from the support by merely removing or disconnecting the straps 12 from the flanges 13, and as easily and quickly replaced.

If desired, a soft rubber cushion may be interposed between the mounting and the tank to cushion the load, and to partly seal the joint between the tank and the mounting so that milk or slop cannot enter the joint or space between the tank and mounting, and become obnoxious.

It will be obvious that various changes in the details, which have been herein described and illustrated in order to explain the nature of the invention, may be made by those skilled in the art within the principle and scope of the invention as expressed in the appended claims.

Claims:

1. An improved mounting for truck tanks comprising members facing and extending lengthwise of the tank along its under surface and connected together beneath the tank to form a support, the upper faces of said members being concave to fit the under peripheral surface of the tank, and means connected to the upper free side edge portions of said members and cooperating with said tank to anchor the tank removably in the seat formed by said members.

2. An improved mounting for truck tanks comprising a support upon which a tank is to rest, said support extending lengthwise of the tank and having spaced longitudinally extending sections having relatively large areas of contact with the under face of said tank and conforming to the curvature of the tank, said members extending for a material distance in a direction peripherally of the tank, and means connected to the upper free edges of said members and cooperating with said tank to anchor the latter removably to said support.

3. An improved mounting for truck tanks comprising two plates extending lengthwise of the tank along the under face thereof and each concave in cross section to fit against the arcuate under surface of the tank, said members being spaced apart, frame means rigidly connecting the lower adjacent edges of said members, and means connected with the free edges of said plates and cooperating with said tank for anchoring the latter removably in the seat formed by the concave faces of said plates.

4. An improved mounting for truck tanks comprising two plates extending lengthwise of the tank along the under face thereof and each concave in cross section to fit against the arcuate under surface of the tank, said members being spaced apart, frame means rigidly connecting the lower adjacent edges of said members and means adjustably connected to the free edges of said plates and cooperating with said tank for drawing the latter firmly into the seat formed by the upper concave faces of said plates.

5. An improved mounting for truck tanks comprising two plates extending lengthwise of the tank along the under face thereof and each concave in cross section to fit against the arcuate under surface of the tank, said members being spaced apart, frame means rigidly connecting the lower adjacent edges of said members, and straps passing over said tank and adjustably connected to the free edges of said plates for drawing the tank into firm engagement with the seat formed by the upper concave faces of said plates.

6. An improved mounting for truck tanks comprising a pair of plates, concave in transverse cross section and extending longitudinally along the under face of a tank to form a seat for the tank, means for connecting the lower and adjacent edges of said plates, means adjustably connected to the upper free edges of said plates and cooperating with said tank to confine the latter removably in the seat formed by said plates, said plates being formed of flexible material whereby when the tank is drawn firmly into the seat, the plates may flex and conform to the curvature of the tank.

7. In a tank truck, a base having flexible plates extending arcuately therefrom and forming a concave seat, a tank resting upon said seat, means adjustably connected to the free edges of said plates and cooperating with said tank to draw the tank firmly into the seat formed by said plates, said plates being sufficiently flexible to conform to the curvature of said tank.

8. In a tank truck, a tank having an arcuate lower surface, a pair of flexible plates disposed against the under surface of said tank is spaced relation to one another and extending in a direction lengthwise of the tank, means connecting the lower adjacent edges of said plates, and means adjustably connected to the free edges of said plates and cooperating with the tank to confine the latter removably in the seat formed by said plates.

9. An improved truck tank mounting comprising a tank having a curved under surface, a plurality of plates extending in a direction lengthwise of the tank and fitted against the under face of said tank in somewhat spaced relation to one another, frame bars connecting adjacent lower edges of said plates at intervals along the same, and means connected to the free side edges of the plates and cooperating with said tank to confine the latter in the seat formed by said plates, said means being adjustable to draw the tank firmly into said seat.

10. An improved mounting for truck tanks comprising a pair of plates extending in a direction lengthwise of the tank along its under surface and spaced somewhat from one another along adjacent edges, the adjacent edges being flanged away from the lower surface of the tank, bars secured to said flanges at intervals along the same and connecting said flanges to one another rigidly, said bars having a head arcuate along its length and conforming to the curvature of the under face of the tank so as to form a continuation of the plates across the space between them, and also having a web extending away from said head and said tank, and means connected to the free edges of said plates and cooperating with said tank to confine the latter removably against said plates.

11. An improved mounting for truck tanks comprising a supporting base upon which the tank may rest and be fully supported thereby and having a relatively rigid section and a broad flexible supporting section of large supporting area extending laterally from the rigid section in a direction circumferentially beneath the tank, and means acting between the tank and said base for confining said tank to said base and flexing the flexible section snugly into contact with and conformity to one arcuate under surface of the tank.

12. In a truck for tanks having a curved under surface, a base having a flexible plate-like section of large supporting area upon which the tank rests and is supported, and means acting adjustably between said tank and base for confining said tank to said base and flexing the plate-like section of said base into conformity to the curvature of the under face of said tank.

RAYMOND J. NEELY.